No. 764,122. PATENTED JULY 5, 1904.
A. M. HALDAWAY.
APPARATUS FOR TREATING SEED GRAIN.
APPLICATION FILED MAR. 17, 1904.
NO MODEL.
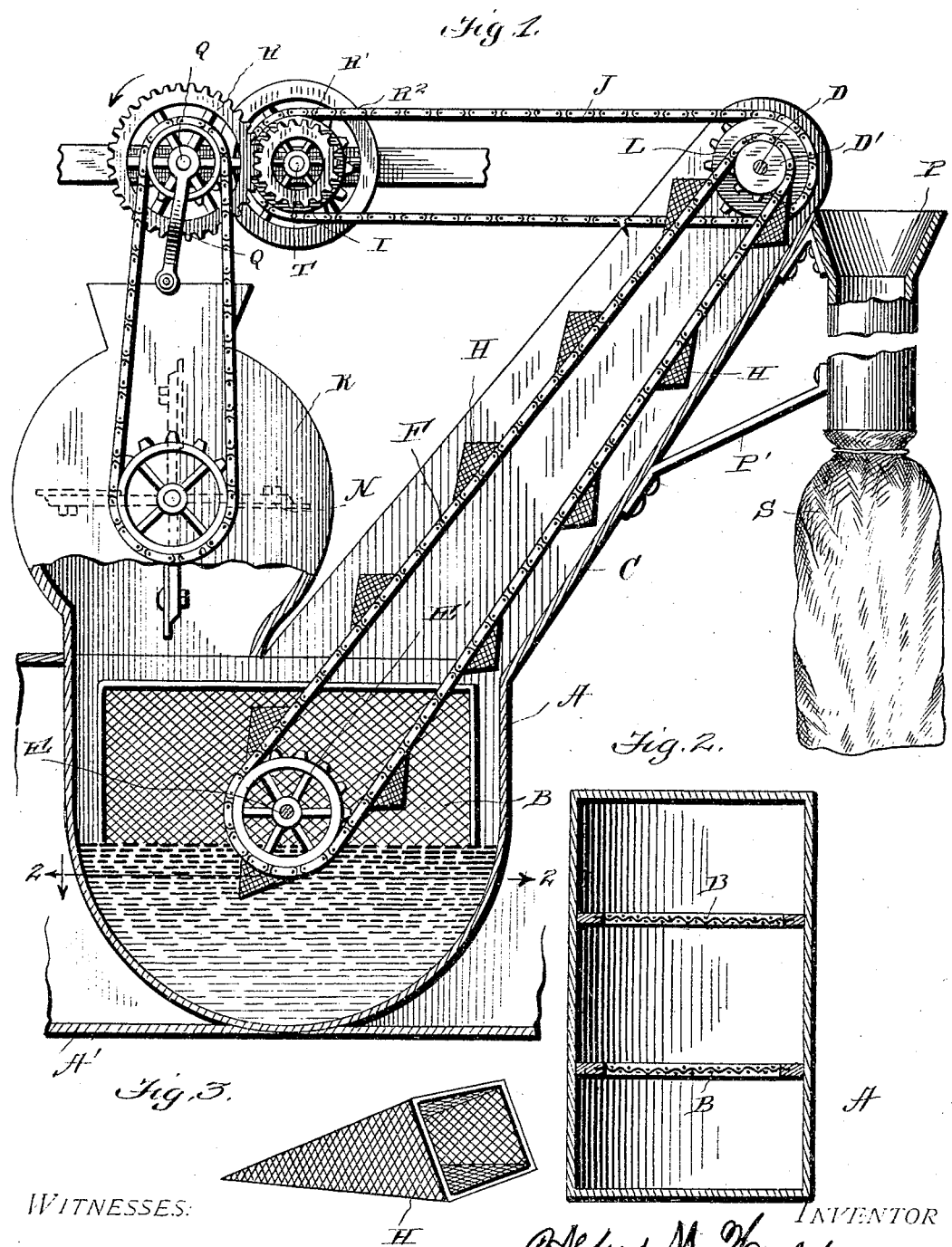

No. 764,122.

Patented July 5, 1904.

UNITED STATES PATENT OFFICE.

ALFRED MARTIN HALDAWAY, OF PLEASANTGROVE, UTAH.

APPARATUS FOR TREATING SEED-GRAIN.

SPECIFICATION forming part of Letters Patent No. 764,122, dated July 5, 1904.

Application filed March 17, 1904. Serial No. 198,664. (No model.)

*To all whom it may concern:*

Be it known that I, ALFRED MARTIN HALDAWAY, a citizen of the United States, residing at Pleasantgrove, in the county of Utah and State of Utah, have invented certain new and useful Improvements in Apparatus for Treating Seed-Grain; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for treating grain which has been affected by sweat to prepare the same for being sown; and the object of the invention is to produce a simple and efficient machine for taking grain from a fan-mill, where it is acted upon preparatory to its being deposited into a receptacle containing a substance which will effectually kill any bacteria or detrimental germ life about the seed, thus putting it in proper condition for sowing.

The invention consists, further, in various details of construction and combinations and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a sectional view through my invention, parts being shown in elevation. Fig. 2 is a cross-sectional view on line 2 2 of Fig. 1 looking in the direction of the arrow, and Fig. 3 is a detail view of one of the cups on the endless carrier-chain.

Reference now being had to the details of the drawings by letters, A designates a receptacle, which has a base A' and has a concaved bottom and is divided into compartments by the perforated screen-partitions B, as shown clearly in Fig. 2 of the drawings. Rising from the casing of said receptacle is a conveyer-frame C, at the upper end of which is journaled a shaft D, while a shaft E is journaled in the end walls of the receptacle. A sprocket-wheel E' is fixed to said shaft E, and a sprocket-wheel D' is fixed to the shaft D, and an endless-chain carrier F passes about said sprocket-wheels and is provided with a series of cups H, which are made of screen material, as shown clearly in Fig. 3 of the drawings, whereby grain which has been scooped from the receptacle in which the liquid material which treats the grain is contained may drain out as it is being raised by the endless carrier.

K designates the casing of a fanning-mill, having a shaft K' mounted therein, to which is keyed a fan-wheel N, and said fan-casing is mounted directly over the receptacle and has an exit directly over the central compartment of the receptacle and into which the grain is adapted to fall as it is acted upon by the fanning-mill. Mounted upon the superstructure of the frame of the fanning-mill is a shaft Q, having a crank-handle Q', and R designates a wheel keyed to said shaft Q and in mesh with the pinion-wheel R', which is fixed to the shaft T. A balance-wheel R² is also fixed to the wheel T, and a sprocket-wheel I is also fixed to the shaft T, and a sprocket-chain J passes about the sprocket-wheel I and also about a sprocket-wheel L, rotating with the shaft D, whereby power may be communicated from the driving-shaft Q to the shaft D for the purpose of operating the endless conveyer.

Fixed to the side of the conveyer-frame is a hopper P, having a brace P', and a bag S is fastened to the lower end of the shank portion of the hopper and into which the grain as it is raised by the endless conveyer may be dropped preparatory to the grain being sown.

In operation it is my purpose to place bluestone or any other material in the receptacle A and into which the grain is adapted to drop from the fanning-mill and by so doing be treated by the preparation, which will have a tendency to kill any bacteria or detrimental germ life which may be upon the seed, and as the buckets or cups on the endless carrier dip into the grain or seed the same will be raised from the solution, and any liquid still remaining will be allowed to drain through the cups before the grain is deposited into the hopper preparatory to its entering the bag.

By the provision of an apparatus embodying the features of my invention it will be observed that a convenient means is provided for treating grain adapted for seed, thus eliminating all danger of planting with the seed any bacteria or detrimental germ life.

While I have shown a particular construction of apparatus embodying my invention, it will be understood that I may make changes in the detailed construction of the same, if desired, without in any way departing from the spirit of my invention.

Having thus fully described my invention, what I claim as new, and desire to secure by Letters Patent, is—

An apparatus for treating grain comprising a receptacle, screen-partitions extending partially across the receptacle and leaving spaces at the ends thereof, a shaft journaled in the walls of said receptacle, a conveyer-frame, a conveyer mounted thereon, a sprocket-wheel journaled upon said shaft and a sprocket-wheel supported by the conveyer-frame, an endless chain passing about said sprocket-wheels and between said partitions, screen-buckets mounted upon said chain, and means for driving said chain, and a hopper secured at the upper end of the conveyer-frame, as shown and described.

In testimony whereof I hereunto affix my signature in presence of two witnesses.

ALFRED MARTIN HALDAWAY

Witnesses:
JOHN F. THORNE,
RONDY B. THORNE.